US012022257B2

(12) United States Patent
Suzuki et al.

(10) Patent No.: US 12,022,257 B2
(45) Date of Patent: Jun. 25, 2024

(54) SOUND APPARATUS AND DISPLAY APPARATUS INCLUDING THE SAME

(71) Applicant: LG DISPLAY CO., LTD., Seoul (KR)

(72) Inventors: Takayuki Suzuki, Tokyo (JP); Jaehun Ye, Tokyo (JP)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/232,005

(22) Filed: Aug. 9, 2023

(65) Prior Publication Data

US 2023/0388719 A1 Nov. 30, 2023

Related U.S. Application Data

(63) Continuation of application No. 17/534,732, filed on Nov. 24, 2021, now Pat. No. 11,765,518.

(30) Foreign Application Priority Data

Nov. 25, 2020 (JP) ................................ 2020-194826

(51) Int. Cl.

| | |
|---|---|
| ***H04R 17/00*** | (2006.01) |
| ***G10H 3/14*** | (2006.01) |
| ***H04R 1/02*** | (2006.01) |

(52) U.S. Cl.

CPC ........... *H04R 17/005* (2013.01); *G10H 3/143* (2013.01); *H04R 1/025* (2013.01); *H04R 2400/03* (2013.01); *H04R 2499/11* (2013.01)

(58) Field of Classification Search

CPC .. H04R 17/005; H04R 1/025; H04R 2400/03; H04R 2499/11; G10H 3/143

USPC ............................................................ 381/19

See application file for complete search history.

(56) References Cited

U.S. PATENT DOCUMENTS

| | | | |
|---|---|---|---|
| 9,761,784 | B2 | 9/2017 | Miyoshi |
| 2010/0054506 | A1 | 3/2010 | Mori |
| 2012/0039493 | A1 | 2/2012 | Rucker |
| 2013/0098228 | A1 | 4/2013 | Tetsirp |

FOREIGN PATENT DOCUMENTS

| | | | |
|---|---|---|---|
| CN | 105096778 | A | 11/2015 |
| CN | 106997757 | A | 8/2017 |
| JP | 2010-157886 | A | 7/2010 |
| JP | 2012-217014 | A | 11/2012 |
| JP | 2012-217039 | A | 11/2012 |
| JP | 2015-219528 | A | 12/2015 |
| JP | 2016-516358 | A | 6/2016 |
| JP | 2016-149737 | A | 8/2016 |
| KR | 20150133918 | A | 12/2015 |
| WO | WO 2013047875 | A1 | 4/2013 |
| WO | WO 2017030192 | A1 | 2/2017 |

OTHER PUBLICATIONS

Korean Office Action dated Jul. 27, 2023 issued in Patent Application No. 10-2021-0163076 (6 pages).
Chinese Office Action dated Dec. 8, 2023 issued in Patent Application No. 202111412417.5 (7 pages).
Japanese Office Action dated Mar. 14, 2024 issued in Patent Application No. 2020-194826 (5 pages).

*Primary Examiner* — Sean H Nguyen
(74) *Attorney, Agent, or Firm* — POLSINELLI PC

(57) ABSTRACT

A sound apparatus includes a piezoelectric device, a vibration member connected to the piezoelectric device, a first magnet connected to the piezoelectric device, and a second magnet facing the first magnet, which can readily realize a desired frequency characteristic.

20 Claims, 10 Drawing Sheets

SOUND APPARATUS AND DISPLAY APPARATUS INCLUDING THE SAME

CROSS-REFERENCE TO RELATED APPLICATIONS

This application is a continuation of U.S. patent application Ser. No. 17/534,732, filed on Nov. 24, 2021, which claims the priority of Japanese Patent Application No. 2020-194826 filed on Nov. 25, 2020, which are hereby incorporated by reference in their entirety.

BACKGROUND

Field of the Disclosure

The present disclosure relates to a sound apparatus and a display apparatus including the same.

Description of the Background

Sound apparatuses include a vibration meter which converts an input electrical signal into a physical vibration. Piezoelectric speakers including ferroelectric ceramic is lightweight and has low power consumption, and thus, is used for various purposes.

Moreover, piezoelectric speakers have a problem where a sound pressure level is not sufficient in a low frequency. Generally, ferroelectric ceramic applied to piezoelectric speakers has high stiffness, and thus, has a large spring constant. Due to this, a lowest resonance frequency of a vibration meter increases, and thus, a sound pressure level of a low frequency band is easily insufficient. Also, because an internal resistance of a vibration meter of a piezoelectric device is low, the resonance sharpness of the vibration meter increases, and thus, a peak and a dip occur easily in a frequency characteristic. Technology described in Japanese Patent Publication No. 2010-157886 attempts to realize a desired frequency characteristic by adjusting a material and a mass of a plate of a piezoelectric speaker.

However, the technology described in Japanese Patent Publication No. 2010-157886 needs to adjust a material and a mass of each member configuring a piezoelectric speaker. Due to this, because a design of a piezoelectric speaker should be repeatedly changed until a desired frequency characteristic is obtained, it is difficult to realize a desired frequency characteristic.

SUMMARY

Accordingly, the present disclosure is directed to providing a sound apparatus and a display apparatus including the same that substantially obviate one or more problems due to limitations and disadvantages described in the background.

More specifically, the present disclosure is directed to providing a sound apparatus which can readily realize a desired frequency characteristic.

Additional advantages and features of the disclosure will be set forth in part in the description which follows and in part will become apparent to those having ordinary skill in the art upon examination of the following or may be learned from practice of the disclosure. Other advantages of the disclosure may be realized and attained by the structure particularly pointed out in the written description and claims hereof as well as the appended drawings.

To achieve these and other aspects of the inventive concepts, as embodied and broadly described, a sound apparatus comprises a piezoelectric device, a vibration member connected to the piezoelectric device, a first magnet connected to the piezoelectric device, and a second magnet facing the first magnet.

In another aspect of the present disclosure, a display apparatus comprises a display panel including an image display surface configured to display an image and a rear surface opposite to the image display surface, and a vibration apparatus configured to vibrate the display panel, the display panel is a vibration member, and the vibration apparatus comprises a sound apparatus comprising a piezoelectric device, a vibration member connected to the piezoelectric device, a first magnet connected to the piezoelectric device, and a second magnet facing the first magnet.

According an aspect of the present disclosure, a vibration of a piezoelectric device may be controlled by using a magnetic force, and thus, a desired frequency characteristic may be easily realized.

According to the aspects of the present disclosure, a sound apparatus with enhanced sound quality may be provided.

Additional features and aspects will be set forth in part in the description that follows and in part will become apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

It is to be understood that both the foregoing general description and the following detailed description of the present disclosure are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principle of the disclosure.

In the drawings.

Figure 1:
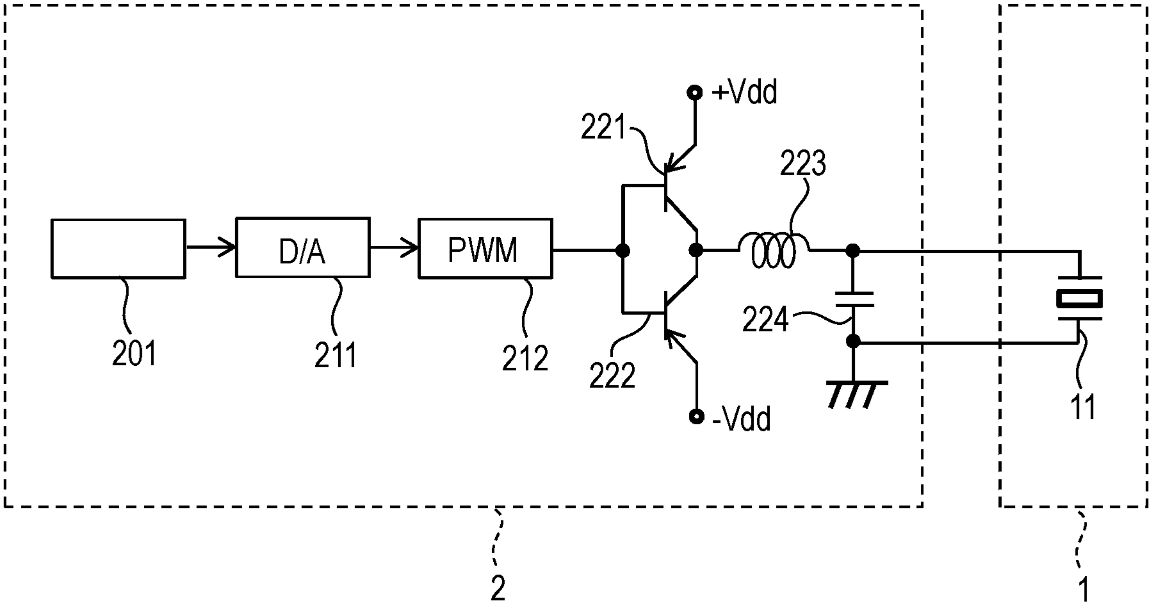
FIG. 1 is a schematic block diagram of a sound apparatus according to a first aspect of the present disclosure.

Throughout the drawings and the detailed description, unless otherwise described the same drawing reference numerals should be understood to refer to the same elements, features, and structures. The relative size and depiction of these elements may be exaggerated for clarity, illustration, and convenience.

DETAILED DESCRIPTION

Reference will now be made in detail to aspects of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Furthermore, the present disclosure is only defined by scopes of claims.

The shape, a size, a ratio, an angle, and a number disclosed in the drawings for describing aspects of the present disclosure are merely an example, and thus, the aspects of present disclosure are not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In the description of aspects, when a structure is described as being positioned "on or above" or "under or below" another structure, this description should be construed as including a case in which the structures contact each other as well as a case in which a third structure is disposed therebetween.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer, the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

A size and a thickness of each component illustrated in the drawing are illustrated for convenience of description, and the present disclosure is not limited to the size and the thickness of the component illustrated.

Features of various aspects of the present disclosure may be partially or overall coupled to or combined with each other, and may be variously inter-operated with each other and driven technically as those skilled in the art can sufficiently understand. Aspects of the present disclosure may be carried out independently from each other, or may be carried out together in co-dependent relationship.

Hereinafter, aspects of the present disclosure will be described in detail with reference to the accompanying drawings. In the drawings, like reference numerals refer to like elements having a common function, and repeated descriptions are omitted or will be briefly given. For convenience of description, a scale of each of elements illustrated in the accompanying drawings differs from a real scale, and thus, is not limited to a scale illustrated in the drawings.

[First Aspect]

FIG. 1 is a schematic block diagram of a sound apparatus according to a first aspect of the present disclosure. A flow of a signal flowing through the sound apparatus 1 will be described with reference to FIG. 1. A sound apparatus 1 according to an aspect of the present disclosure may be individually applied as a speaker or embedded into another apparatus. For example, the sound apparatus 1 may be embedded into a signage such as an advertising signboard, a poster, and a noticeboard. In this case, a voice such as guidance may be generated from a signage. Also, the sound apparatus 1 may be embedded into display apparatus, a computer, and a television, or the like. However, the use of the sound apparatus 1 according to an aspect of the present disclosure is not limited thereto.

The sound apparatus 1 may include a piezoelectric device (or piezoelectric element) 11. The piezoelectric device 11 may be an element (or a device) which is displaced based on an inverse piezoelectric effect when a voltage based on an input sound signal is applied thereto. The piezoelectric device 11, for example, may be an element which is flexurally displaced based on a voltage such as bimorph, unimorph, or multimorph. An input voice signal (or input sound signal or input vibration driving signal) may be an alternating current (AC) voltage generally, and thus, the piezoelectric device 11 may function as a vibration element which vibrates based on the input voice signal.

A host system 2 may be a system including an apparatus or a plurality of apparatuses, which supply the voice signal to control the sound apparatus 1. However, the host system 2 may further supply other signals such as an image signal (for example, RGB data) and a timing signal (for example, a vertical synchronization signal, a horizontal synchronization signal, and a data enable signal, etc.) or the like based on the use purpose of the sound apparatus 1. The host system 2 may be, for example, a source sound reproduction apparatus, a local broadcast apparatus, a radio broadcast reproduction system, a television (TV) system, a set-top box, a navigation system, an optical disk player, a computer, a home theater system, a video phone system, or the like. Also, the sound apparatus 1 and the host system 2 may be an integrated apparatus or separate apparatuses.

The host system 2 may include a digital-to-analog (D/A) converter 211, a pulse width modulation (PWM) circuit 212, a plurality of transistors 221 and 222, a coil 223, and a capacitor 224. The input unit 201 may input a digital signal configured to control the piezoelectric device 11. The D/A converter 211 may convert the digital signal input from the input unit 201 into an analog signal. The PWM circuit 212 may pulse-width-modulate the analog signal input from the D/A converter 211 to output a pulse signal. A PNP type transistor 221 and an NPN type transistor 222 may configure a push-pull circuit. For example, a collector terminal of the transistor 221 may be connected to a collector terminal of the transistor 222, and a base terminal of the transistor 221 may be connected to a base terminal of the transistor 222. A positive voltage +Vdd may be applied to an emitter terminal of the transistor 221, and a negative voltage −Vdd may be applied to an emitter terminal of the transistor 222. The PWM circuit 212 may apply the pulse signal to the base terminals of the transistors 221 and 222, and the transistors 221 and 222 may be complementarily turned on or off based on the pulse signal. For example, when a positive pulse signal is applied to the base terminals of the transistors 221 and 222, the transistor 221 may be turned on, and the transistor 222 may be turned off. Therefore, a voltage at the collector terminal of each of the transistors 221 and 222 may be a voltage +Vdd. On the other hand, when a negative pulse signal is applied to the base terminals of the transistors 221 and 222, the transistor 221 may be turned off, and the transistor 222 may be turned on. Therefore, a voltage at the collector terminal of each of the transistors 221 and 222 may be a voltage −Vdd. Also, when a potential of the pulse signal is a ground potential, the transistors 221 and 222 may be turned off simultaneously. The coil 223 and the capacitor 224 may each function as a low pass filter and may smooth the pulse signal at the collector terminal of each of the transistors 221 and 222 to output a driving signal to the piezoelectric device 11.

Figure 2:
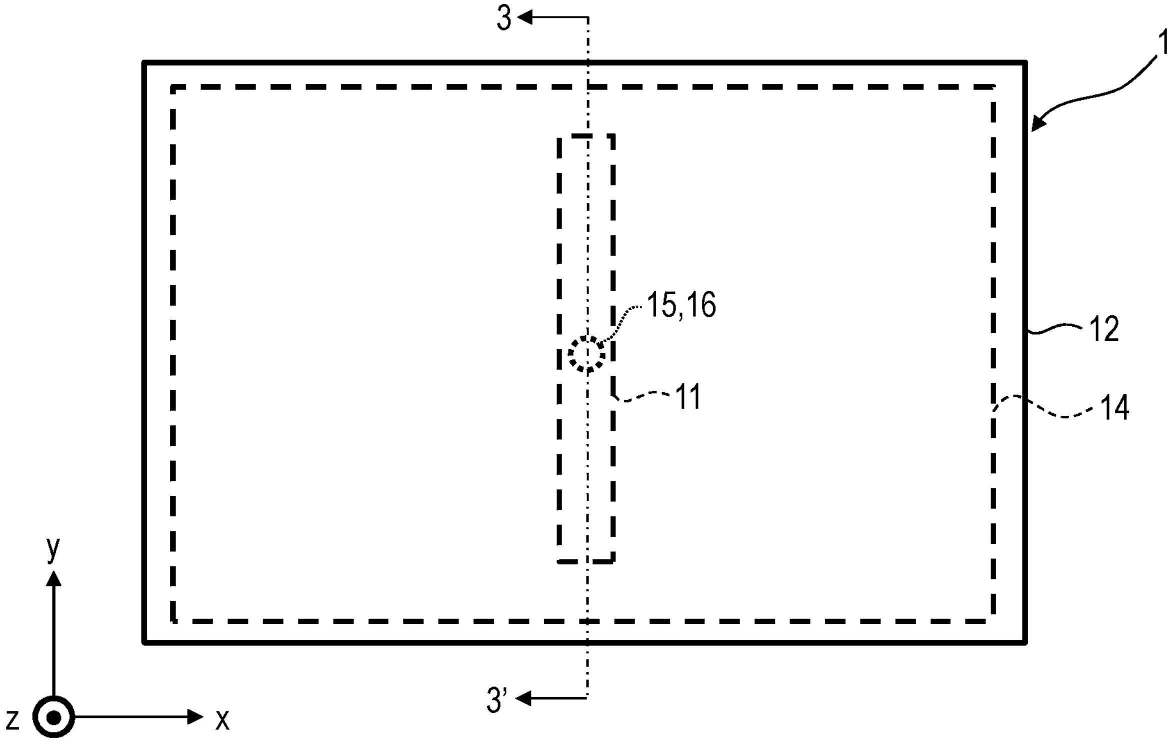
FIG. 2 is a plan view of a detailed configuration of a sound apparatus according to a first aspect of the present disclosure.
Figure 3:
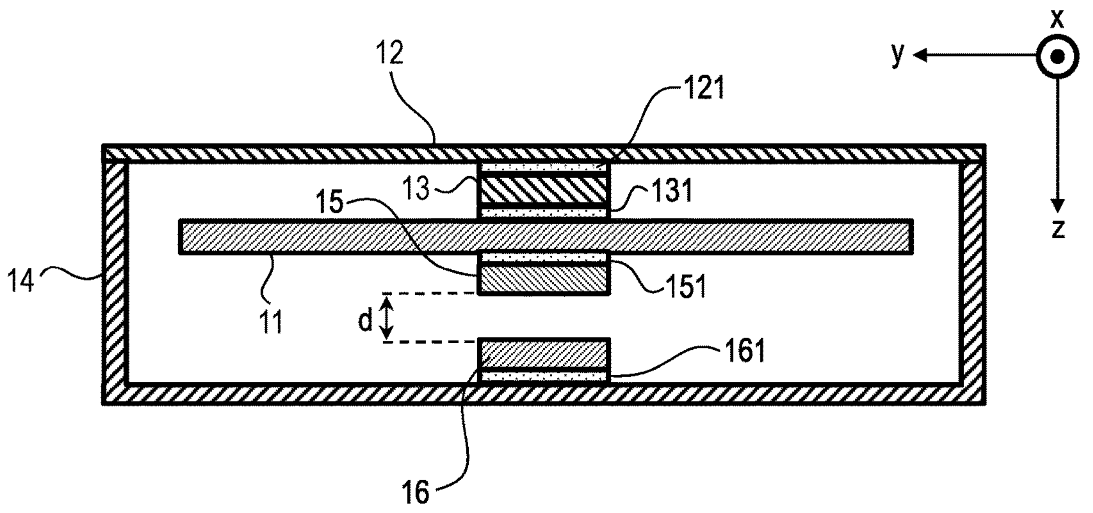
FIG. 3 is a cross-sectional view of a detailed configuration of the sound apparatus according to the first aspect of the present disclosure.

FIG. 2 is a plan view of a detailed configuration of a sound apparatus 1 according to a first aspect of the present disclosure. FIG. 3 is a cross-sectional view of a detailed configuration of the sound apparatus 1 according to the first aspect of the present disclosure. FIG. 3 illustrates a cross-sectional view taken along line 3-3' illustrated in FIG. 2. A detailed configuration of the sound apparatus 1 according to the first aspect of the present disclosure will be described below with reference to FIGS. 2 and 3.

As illustrated in FIGS. 2 and 3, the sound apparatus 1 may include a piezoelectric device 11, a vibration member 12, an elastic member 13, a case 14, a first magnet 15, and a second magnet 16.

The case 14 may have a box shape which includes four sidewalls and one lower wall (or bottom wall). The case 14 may include, for example, a material such as glass, resin, metal, wood, or hard paper, or the like, but a material of the case 14 is not limited to a specific material. An opening portion having a rectangular shape may be formed inward (or inside) from a sidewall of the case 14. The vibration member 12 may have a rectangular thin plate shape and may be mounted on the case 14 to cover the opening portion. For example, the vibration member 12 may be connected to the case 14 by a compressed resin material, an adhesive, and an adhesive tape (not shown) without an empty gap. The vibration member 12 may be a member which easily vibrates like glass, resin, hard paper, compressed paper, plastic, cloth, fiber, leather, or wood. A frequency characteristic of the sound apparatus 1 may be changed by appropriately modifying a volume and a shape of the case 14. For example, a volume of the case 14 may increase, and thus, a sound pressure may be enhanced in a low frequency.

In the plan view of FIG. 2 (or when seen in a plane), the piezoelectric device 11 may have, for example, a rectangular shape in a long-side direction (a y direction in the drawing) and a short-side direction (an x direction in the drawing). Therefore, when seen in a cross-sectional surface (line 3-3') in a long-side direction, deformation such as being bent may occur. The piezoelectric device 11 may be disposed at a center position of the vibration member 12, and a vibration of the piezoelectric device 11 may travel from a center position of the vibration member 12 to a nearby region. Also, a shape of the piezoelectric device 11 may be circular, oval, or regular polygonal. Also, the number of piezoelectric devices 11 is not limited to one, and a plurality of piezoelectric devices 11 may also be provided.

The elastic member (or a first elastic member) 13 may have a pillar shape and may be disposed between the piezoelectric device 11 and the vibration member 12. In a plan view (or when seen in a plane), the elastic member 13 may be disposed at a center of the piezoelectric device 11. The number and positions of elastic members 13 are not limited to the aspects of FIGS. 2 and 3, and for example, in terms of a plan view, two elastic members 13 may be disposed around both end portions of the piezoelectric device 11. The elastic member 13 may include a material having elasticity and may be implemented with an elastic element such as rubber having a modulus which is less than each of the piezoelectric device 11 and the vibration member 12. The elastic member 13 may provide an effect of lowering a lowest resonance frequency. Therefore, comparing with a high frequency vibration of the piezoelectric device 11, a low frequency vibration may be easily transferred to the vibration member 12, and thus, a sound pressure level of the low frequency vibration in the vibration member 12 may be enhanced. The piezoelectric device 11 and the elastic member 13 may be connected to each other by an adhesive member 131, and the vibration member 12 and the elastic member 13 may be connected to each other by an adhesive member 121. The adhesive members 121 and 131 may include a compressed resin material, an adhesive, or an adhesive tape, or the like, but aspects of present disclosure are not limited thereto.

The first magnet 15 and the second magnet 16 may form a thin plate shape and may include, for example, a ferrite magnet, a samarium cobalt magnet, or a neodymium magnet, or the like. The first magnet 15 may be disposed at a surface, which is opposite to a surface adjacent to the vibration member 12 of surfaces of the piezoelectric device 11. Also, the second magnet 16 may be disposed at an inner surface of a lower sidewall of the case 14 so as to be opposite to the first magnet 15. In the plan view of FIG. 2, the first magnet 15, the second magnet 16, and the elastic member 13 may be disposed to overlap or overlay to each other. For example, the first magnet 15, the second magnet 16, and the elastic member 13 may be disposed to be opposite to one another in a z direction (or a thickness direction of a magnet) thereof. Based on such a configuration, a magnetic force acting between the first magnet 15 and the second magnet 16 may be efficiently transferred to the vibration member 12 through the elastic member 13. The piezoelectric device 11 may be connected to the first magnet 15 through an adhesive member 151, and the case 14 may be connected to the second magnet 16 through an adhesive member 161. The adhesive members 151 and 161 may be configured to be equal to the adhesive members 121 and 131. Also, the first magnet 15 and the second magnet 16 may be disposed so that the same magnetic poles (an N pole and an N pole or an S pole and an S pole) are facing (or opposite to) each other, or may be disposed so that opposite magnetic poles (an N pole and an S pole) are facing (or opposite to) each other. Also, the first magnet 15 and the second magnet 16 may be disposed spaced apart from each other by a distance d therebetween. The distance d may have an arbitrary value which is greater than 0. Also, a magnetic flux density of each of the first magnet 15 and the second magnet 16 may have an arbitrary value. A force applied to the vibration member 12 may be appropriately adjusted based on a value of the magnetic flux density of each of the first magnet and the second magnet 16 and the distance d therebetween.

Figure 4:
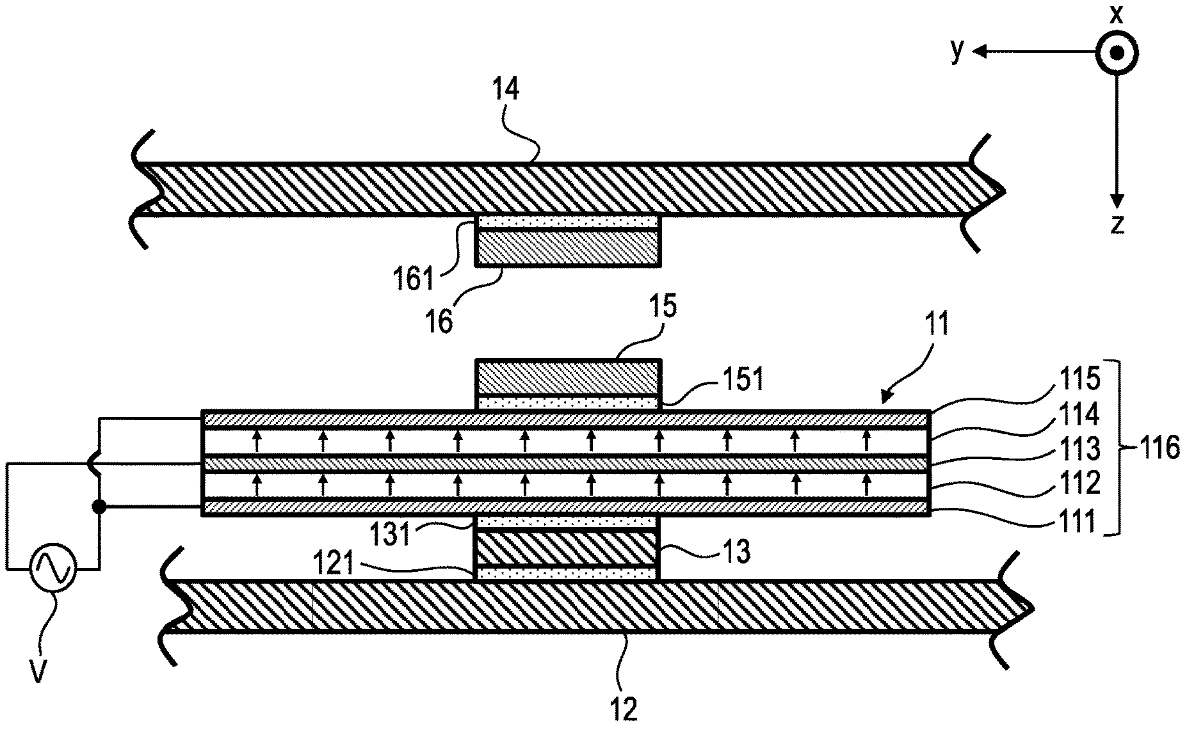
FIG. 4 is a cross-sectional view illustrating in more detail a structure of a piezoelectric device according to a first aspect of the present disclosure.

FIG. 4 is a cross-sectional view illustrating in more detail a structure of a piezoelectric device 11 according to a first aspect of the present disclosure. FIG. 4 illustrates a cross-sectional view taken along line 3-3' illustrated in FIG. 2. Also, FIG. 4 schematically illustrates a circuit diagram of the piezoelectric device 11 of bimorph where two piezoelectric layers are stacked, and for example, illustrates a connection of each electrode included in the piezoelectric device 11.

The piezoelectric device 11 may include a piezoelectric portion 116 including a plurality of electrodes 111, 113, and 115 and a plurality of piezoelectric layers 112 and 114. The electrode (or a first electrode) 111 disposed closest to the vibration member 12 may be connected to the elastic member 13. The electrode 111 and the electrode (or a second electrode) 113 may be disposed with the piezoelectric layer (or a first piezoelectric layer) 112 therebetween in a thickness direction. The electrode 113 and the electrode (or a third electrode) 115 may be disposed with the piezoelectric layer (or a second piezoelectric layer) 114 therebetween in a thickness direction. Arrows illustrated in the piezoelectric layers 112 and 114 represent polarization directions of the piezoelectric layers 112 and 114. For example, a polarization direction of the piezoelectric layer 112 may be the same as a polarization direction of the piezoelectric layer 114. Also, lines configured to apply a voltage to each electrode may be connected to the electrodes 111, 113, and 115 through soldering, but in FIG. 4, the illustration of each line is omitted.

A voltage applied to the piezoelectric device 11 may be an alternating current (AC) voltage based on a frequency of a voice signal. In FIG. 4, an AC voltage is illustrated as an AC power source V. For example, a voltage applied to the piezoelectric device 11 may be based on the voice signal, and thus, may be an AC voltage corresponding to a frequency of a voice (or a sound) which is to be generated. One terminal (or a first terminal) of the AC power source V may be connected to the electrodes 111 and 115, and the other terminal (or a second terminal) of the AC power source V may be connected to the electrode 113. For example, voltages having the same phase (or in-phase) may be applied to the electrode 111 and the electrode 115, voltages having opposite phases (or anti-phases) may be applied to the electrode 111 and the electrode 113, and voltages having opposite phases may be applied to the electrode 113 and the electrode 115. Accordingly, voltages having opposite directions may be applied to the piezoelectric layer 112 and the piezoelectric layer 114.

Materials of the piezoelectric layers 112 and 114 are not limited thereto, but may include ferroelectric ceramic, having piezoelectric properties, such as lead zirconate titanate (PZT)-based materials so as to increase the amount of displacement. Also, although not shown in a configuration of FIG. 4, an outer circumference (or an outer perimeter) of the piezoelectric device 11 may be covered by an insulator such as resin or the like so as to inhibit or prevent an electrical short circuit between the piezoelectric device 11 and the other members.

Figure 5:
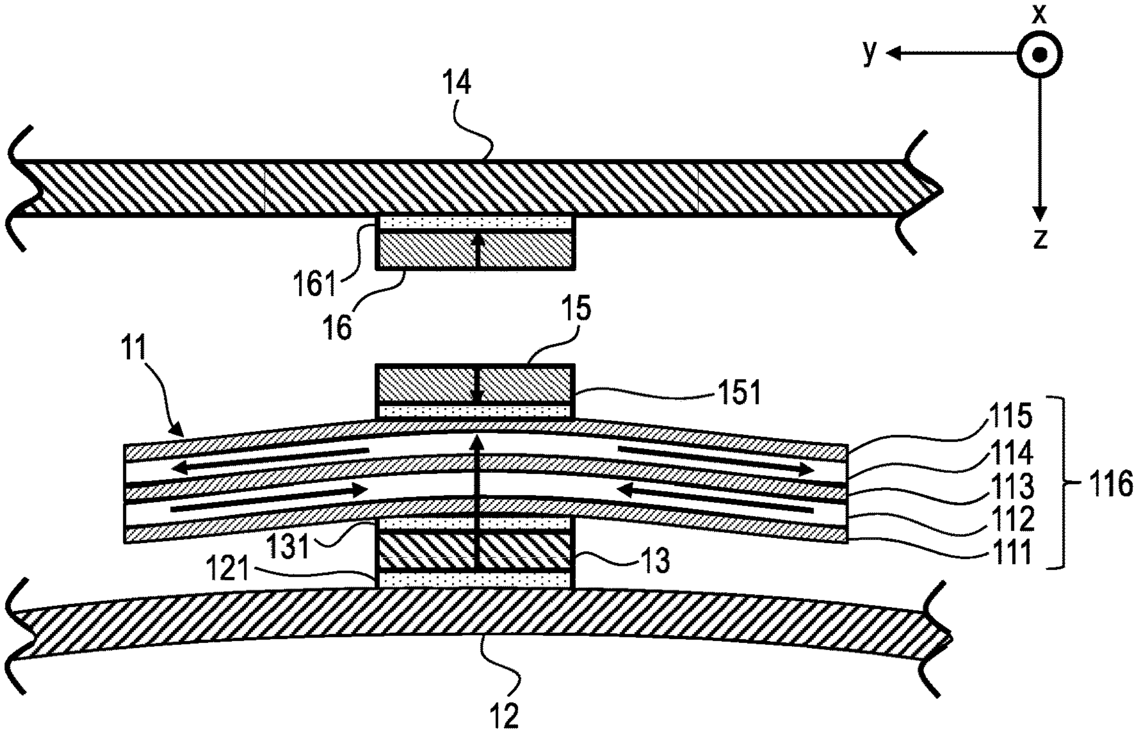
FIG. 5 is schematic diagrams illustrating deformation when a voltage is applied to the piezoelectric device according to the first aspect of the present disclosure.
Figure 6:
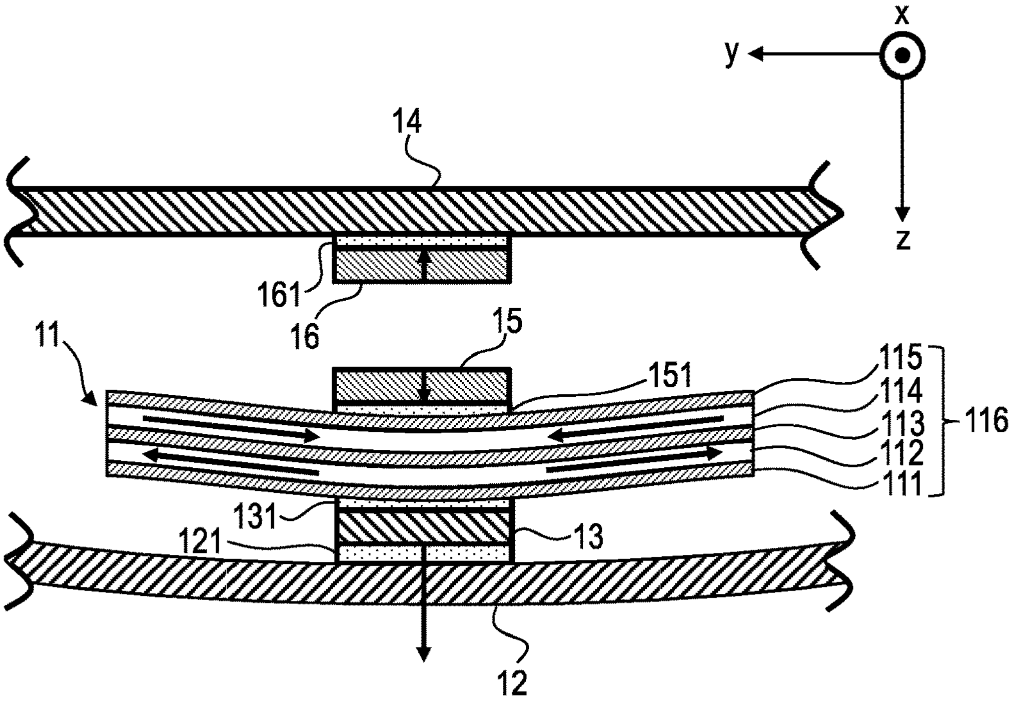
FIG. 6 is schematic diagrams illustrating deformation when a voltage is applied to the piezoelectric device according to the first aspect of the present disclosure.

FIGS. 5 and 6 are schematic diagrams illustrating deformation when a voltage is applied to the piezoelectric device 11 according to the first aspect of the present disclosure. As illustrated in FIG. 4, polarization directions of piezoelectric layers 112 and 114 may be the same, and voltages applied to the piezoelectric layers 112 and 114 may have opposite directions (or reversed directions). Accordingly, a stretching direction (or an expansion and contraction direction) of the piezoelectric layer 112 and the piezoelectric layer 114 may be opposite or inverted (or reversed) to each other.

As illustrated in FIG. 5, when the piezoelectric layer 112 contracts in a widthwise direction (a y direction or a −y direction), the piezoelectric layer 114 may expand in the widthwise direction (or horizontal direction). Therefore, an end portion of the piezoelectric device 11 may be deformed in a downward direction (a z direction), and a center portion of the piezoelectric device 11 may be deformed in an upward direction (a −z direction). When applied voltages have opposite polarities, as illustrated in FIG. 6, the piezoelectric layer 112 may expand in the widthwise direction, and the piezoelectric layer 114 may contract in the widthwise direction. Accordingly, the end portion of the piezoelectric device 11 may be deformed in the upward direction, and the center portion of the piezoelectric device 11 may be deformed in the downward direction.

When an AC voltage based on a voice signal is applied to the piezoelectric device 11, the piezoelectric device 11 may be alternately repeated in a deformation state of FIG. 5 and a deformation state of FIG. 6. Therefore, a vibration of the piezoelectric device 11 may be transferred to the vibration member 12, and the vibration member 12 may vibrate. Accordingly, a sound based on the voice signal may be generated in the vibration member 12.

In an aspect of the present disclosure, a vibration meter including the vibration member 12 and the piezoelectric device 11 may be pressed by a magnetic force between the first magnet and the second magnet 16. The magnetic force may function as a machine resistance and a mass applied to the vibration meter. A mass of the vibration meter may substantially increase, and thus, a lowest resonance frequency of the vibration meter may decrease, thereby enhancing a sound pressure level of a low frequency. Also, the machine resistance of the vibration meter may increase, and thus, the resonance sharpness of the vibration meter may decrease, thereby inhibiting or preventing a peak and a dip from occurring in a frequency characteristic.

The magnetic force acting between the first magnet 15 and the second magnet 16 may be adjusted by adjusting the distance d or a material of the second magnet 16. Particularly, the adjustment of the distance d may not need the changing of a mass or a material of each member configuring the vibration meter and may easily adjust a frequency characteristic of the vibration meter. As described above, according to an aspect of the present disclosure, a vibration of the piezoelectric device 11 may be controlled by using a magnetic force, thereby implementing the sound apparatus 1 for easily realizing a desired frequency characteristic. Particularly, comparing with the related art, a sound pressure level of a low frequency band which is insufficient may be enhanced without changing a mass or a material of the vibration meter including the piezoelectric device 11.

Moreover, in an aspect of the present disclosure, the second magnet 16 provided in the case 14 may not contact the first magnet 15 provided at the piezoelectric device 11. Therefore, a vibration of the piezoelectric device 11 may not be easily transferred to the case 14, and thus, an undesired vibration of the case 14 may be inhibited or prevented and a sound pressure level generated from the vibration member 12 may be enhanced. For example, with reference to a sound apparatus illustrated in FIG. 7 as a comparative example, an elastic member 17 (or a second elastic member 17) instead of the first magnet 15 and the second magnet 16 may be disposed between the case 14 and the piezoelectric device 11, and the elastic member 17 may include a material, having elasticity, such as rubber. The piezoelectric device 11 and the elastic member 17 may be connected by an adhesive member 171 to each other, and a lower wall of the case 14 and the elastic member 17 may be connected to by an adhesive member 172 to each other. The piezoelectric device 11 may be provided with a stress applied toward the vibration member 12 by the elastic member 17, and despite a configuration of the comparative example, a frequency characteristic of the vibration meter may be adjusted by the elastic member 17.

Figure 7:
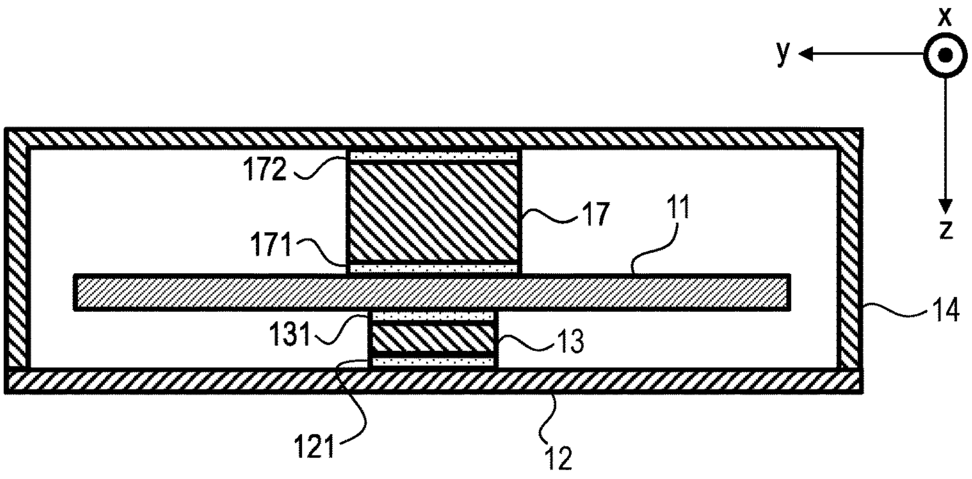
FIG. 7 is a cross-sectional view of a structure of the sound apparatus according to a comparative example.

However, in the comparative example of FIG. 7, a vibration of the piezoelectric device 11 may be transferred to the lower wall of the case 14 through the elastic member 17. At this time, the lower wall of the case 14 may vibrate based on an opposite phase of a vibration of the vibration member 12. A sound generated from the lower wall of the case 14 may return to the vibration member 12 and may offset (or may destruct) a sound generated from the vibration member 12. Due to this, particularly, a sound pressure level of a low frequency may be insufficient. According to the first aspect of the present disclosure, because the piezoelectric device 11 does not contact the lower wall of the case 14, a problem of the comparative example may be solved. Thus, the sound apparatus according to the first aspect of the present disclosure may inhibit or prevent a reduction in a sound pressure level and may obtain a desired frequency characteristic.

Figure 8:
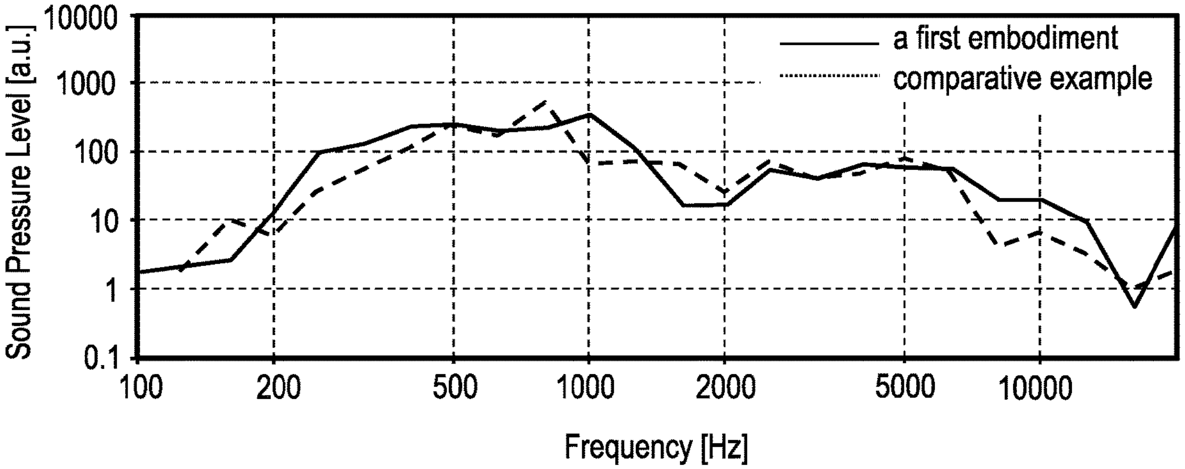
FIG. 8 is a diagram for describing a frequency characteristic of a sound apparatus according to a first aspect of the present disclosure.

FIG. 8 is a diagram for describing a frequency characteristic of a sound apparatus 1 according to a first aspect of the present disclosure. In FIG. 8, the abscissa axis represents a frequency of a signal applied to the piezoelectric device 11, and the ordinate axis represents a sound pressure level generated from the sound apparatus 1. Also, FIG. 8 shows a log-log graph. Also, a solid line represents a frequency characteristic of the sound apparatus 1 in the first aspect of the present disclosure, and a dotted line represents a frequency characteristic of a sound apparatus of a comparative example where a magnet is not provided. Also, a magnet may not be provided in a vibration meter of the sound apparatus of the comparative example, but a mass of a vibration meter may be the same as a mass of the vibration meter in the first aspect of the present disclosure.

As seen in FIG. 8, according to the first aspect of the present disclosure, it may be seen that a sound pressure level in a low frequency (for example, about 200 Hz to about 500 Hz) is considerably enhanced compared to the comparative example. For example, it may be seen that a sound pressure level in a low frequency of a vibration meter is particularly enhanced by a magnetic force acting between the first magnet 15 and the second magnet 16. Also, in the first aspect of the present disclosure, it may be seen that a stable sound pressure level is implemented in a middle-pitched sound band from a low-pitched sound band of about 200 Hz to about 1,500 Hz. Furthermore, in the first aspect of the present disclosure, it may be seen that a peak and a dip of a sound pressure level of a high-pitched sound band from the middle-pitched sound band are reduced, and thus, the flatness of a frequency characteristic is enhanced.

As described above, the sound apparatus 1 according to the first aspect of the present disclosure may control a vibration of the piezoelectric device 11 using a magnetic force to easily realize a desired frequency characteristic.

[Second Aspect]

A sound apparatus 1 according to a second aspect of the present disclosure will be described with reference to FIG. 9. The second aspect of the present disclosure may differ from the first aspect in that a first magnet 15 is disposed at a bottom surface (or a lower surface) of a piezoelectric device 11. Hereinafter, in the sound apparatus 1 according to the second aspect of the present disclosure, elements which differ from the elements of the sound apparatus according to the first aspect of the present disclosure will be described mainly.

Figure 9:
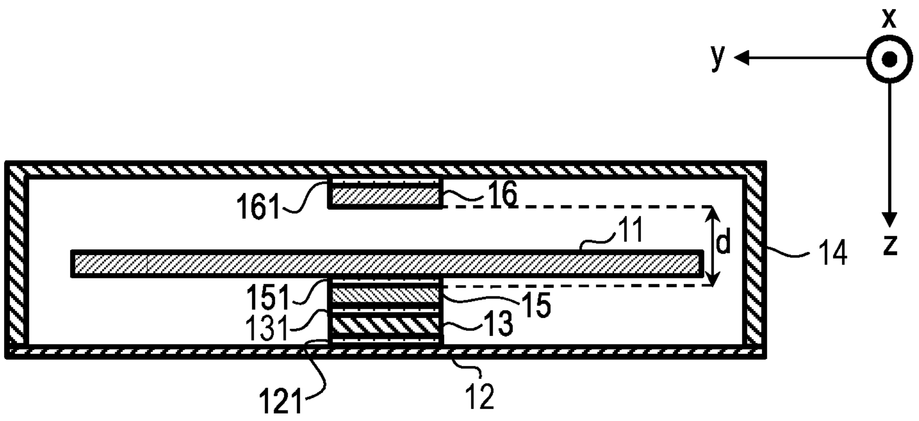
FIG. 9 is a schematic cross-sectional view illustrating a structure of a sound apparatus according to a second aspect of the present disclosure.

FIG. 9 is a schematic cross-sectional view illustrating a structure of a sound apparatus 1 according to a second aspect of the present disclosure and illustrates a cross-sectional view taken along line 3-3' illustrated in FIG. 2. A first magnet 15, a bottom surface of a piezoelectric device 11, may be disposed between the piezoelectric device 11 and an elastic member 13. The elastic member 13 and the first magnet 15 may be connected by an adhesive member 131 to each other, and the piezoelectric device 11 and the first magnet 15 may be connected by an adhesive member 151 to each other. The first magnet 15 and the second magnet 16 may be disposed spaced apart from each other by a distance d therebetween.

In the second aspect of the present disclosure, a magnetic force acting between the first magnet 15 and the second magnet 16 may function as a machine resistance and a mass applied to a vibration meter. A force applied to a vibration member 12 may be appropriately adjusted based on a magnetic flux density of each of the first magnet 15 and the second magnet 16 and a value of a distance d therebetween. Therefore, the second aspect of the present disclosure may provide the sound apparatus 1 having the same effect as the first aspect of the present disclosure. Also, the arrangement of the first magnet 15 in the second aspect of the present disclosure may differ from the arrangement of the first magnet 15 in the first aspect of the present disclosure. For example, the distance d in the second aspect of the present disclosure may be greater than the distance d in the first aspect of the present disclosure. Accordingly, in a case where the magnetic force acting between the first magnet 15 and the second magnet 16 needs to decrease for obtaining a desired frequency characteristic, a configuration of the sound apparatus 1 according to the second aspect of the present disclosure may be effective.

[Third Aspect]

A sound apparatus 1 according to a third aspect of the present disclosure will be described with reference to FIG. 10. The third aspect of the present disclosure may differ from the first aspect in that a second magnet 16 is disposed at an outer surface of the case 14. Hereinafter, in the sound apparatus 1 according to the third aspect of the present disclosure, elements which differ from the elements of the sound apparatus according to the first aspect of the present disclosure will be described mainly.

Figure 10:
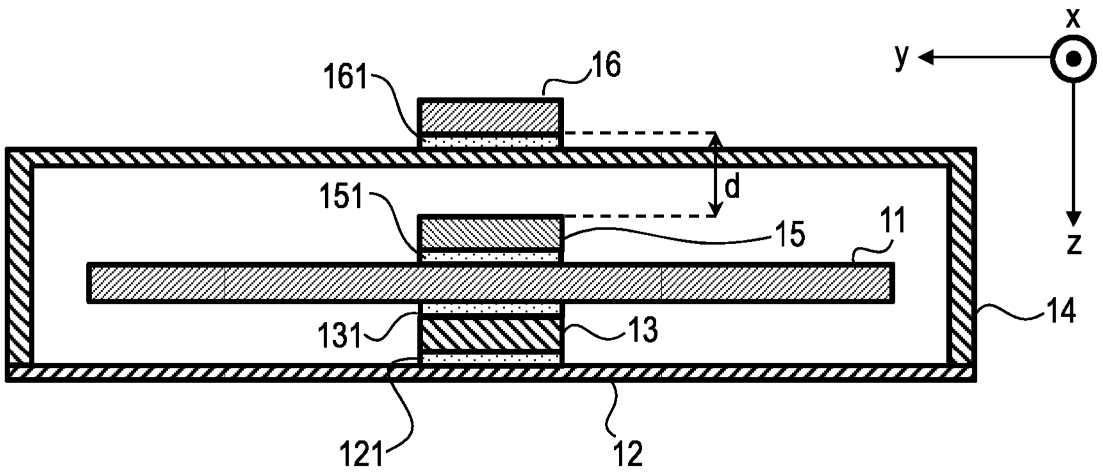
FIG. 10 is a schematic cross-sectional view illustrating a structure of a sound apparatus according to a third aspect of the present disclosure.

FIG. 10 is a schematic cross-sectional view illustrating a structure of a sound apparatus 1 according to a third aspect of the present disclosure and illustrates a cross-sectional view taken along line 3-3' illustrated in FIG. 2. A second magnet 16 may be disposed at an outer surface of the lower wall of the case 14 and may be connected to the case 14 by an adhesive member 161. The first magnet 15 and the second magnet 16 may be disposed to be opposite to one another by a distance d therebetween.

In the third aspect of the present disclosure, a magnetic force acting between the first magnet 15 and the second magnet 16 may function as a machine resistance and a mass applied to a vibration meter. A force applied to a vibration member 12 may be appropriately set based on a magnetic flux density of each of the first magnet 15 and the second magnet 16 and a value of a distance d therebetween. Therefore, the third aspect of the present disclosure may provide the sound apparatus 1 having the same effect as the first aspect of the present disclosure. Also, the arrangement of the second magnet 16 in the third aspect of the present disclosure may differ from the arrangement of the second magnet 16 in the first aspect of the present disclosure. For example, the distance d in the third aspect of the present disclosure may be greater than the distance d in the first aspect of the present disclosure. Accordingly, in a case where the magnetic force acting between the first magnet 15 and the second magnet 16 needs to decrease for obtaining a desired frequency characteristic, a configuration of the sound apparatus 1 according to the third aspect of the present disclosure may be effective.

Also, in the third aspect of the present disclosure, a frequency characteristic of the sound apparatus 1 may be adjusted by changing the second magnet 16 disposed at an outer surface of the case 14. In other words, a frequency characteristic of the sound apparatus 1 may be adjusted without changing an internal member (or an internal structure) of the sound apparatus 1. Accordingly, according to the third aspect of the present disclosure, a vibration of the piezoelectric device 11 may be controlled by using a magnetic force, and thus, a frequency characteristic may be more easily adjusted.

[Fourth Aspect]

A sound apparatus 1 according to a fourth aspect of the present disclosure will be described with reference to FIG. 11. The fourth aspect of the present disclosure may differ from the first aspect in that a third magnet 18 is further provided. Hereinafter, in the sound apparatus 1 according to the fourth aspect of the present disclosure, elements which differ from the elements of the sound apparatus according to the first aspect of the present disclosure will be described mainly.

Figure 11:
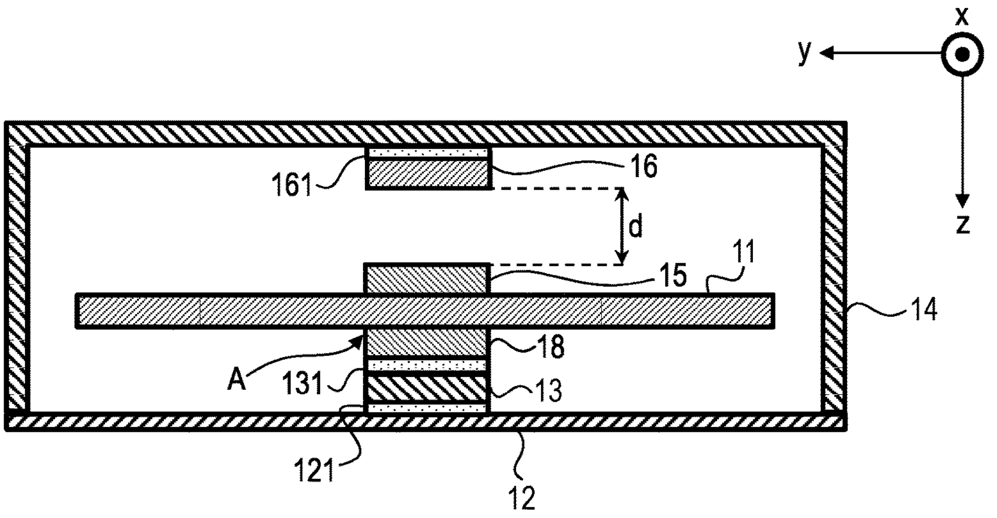
FIG. 11 is a schematic cross-sectional view illustrating a structure of a sound apparatus according to a fourth aspect of the present disclosure.

FIG. 11 is a cross-sectional view schematically illustrating a structure of a sound apparatus 1 according to a fourth aspect of the present disclosure and illustrates a cross-sectional view taken along line 3-3' illustrated in FIG. 2. The sound apparatus 1 may further include a third magnet 18. The third magnet 18 may have the same shape as each of a first magnet 15 and a second magnet 16. The third magnet 18 may be disposed at a surface, which is opposite to a surface where the first magnet 15 is disposed, of surfaces of a piezoelectric device 11. The first magnet 15 and the third magnet 18 may be disposed so that opposite (or different) magnetic poles are facing (or opposite to) each other, and an attractive force (or a sucking force) may act between the first magnet 15 and the third magnet 18. Therefore, a magnetic flux density of the first magnet may be enhanced, and thus, a pressing force between the first magnet 15 and the second magnet 16 may increase. The third magnet 18 may be connected to an elastic member 13 through an adhesive member 131. Also, the first magnet 15, the second magnet 16, the third magnet 18, and the elastic member 13 may be disposed to overlap or overlay. For example, the first magnet 15, the second magnet 16, the third magnet 18, and the elastic member 13 may be disposed to be opposite to one another in a z direction. Based on such a configuration, a magnetic force acting between the first magnet 15, the second magnet 16, and the third magnet 18 may be effectively transferred to the vibration member 12 through the elastic member 13.

In the fourth aspect of the present disclosure, the magnetic force acting between the first magnet 15, the second magnet 16, and the third magnet 18 may function as a machine resistance and a mass applied to the vibration meter. Therefore, a force applied to the vibration member 12 may be appropriately set based on a magnetic flux density of each of the first magnet 15, the second magnet 16, and the third magnet 18 and a value of a distance d therebetween. As described above, a magnetic flux density of the first magnet 15 may be reinforced by the third magnet 18. Also, the distance d in the fourth aspect of the present disclosure may be reduced by a thickness (a length in a z direction) of the third magnet 18 compared to the first aspect of the present disclosure. Therefore, in a case where a magnetic force acting between the first magnet 15 and the second magnet 16 needs to reinforce for obtaining a desired frequency characteristic, a configuration in the fourth aspect of the present disclosure may be effective. Furthermore, the piezoelectric device 11 may be supported between the first magnet 15 and the third magnet 18 by an attractive force (or a sucking force) between the first magnet 15 and the third magnet 18. Accordingly, the first magnet 15, the third magnet 18, and the piezoelectric device 11 may be configured to be attachable/detachable. For example, the piezoelectric device 11 may be detachably connected to the vibration member 12 at an isolation portion A, and thus, the piezoelectric device 11 may be easily installed and replaced.

[Fifth Aspect]

A sound apparatus 1 according to a fifth aspect of the present disclosure will be described with reference to FIG. 12. The fifth aspect of the present disclosure may differ from the fourth aspect in that a first magnet 15 is disposed at a bottom surface of a piezoelectric device 11. Hereinafter, in the sound apparatus 1 according to the fifth aspect of the present disclosure, elements which differ from the elements of the sound apparatus according to the fourth aspect of the present disclosure will be described mainly.

Figure 12:
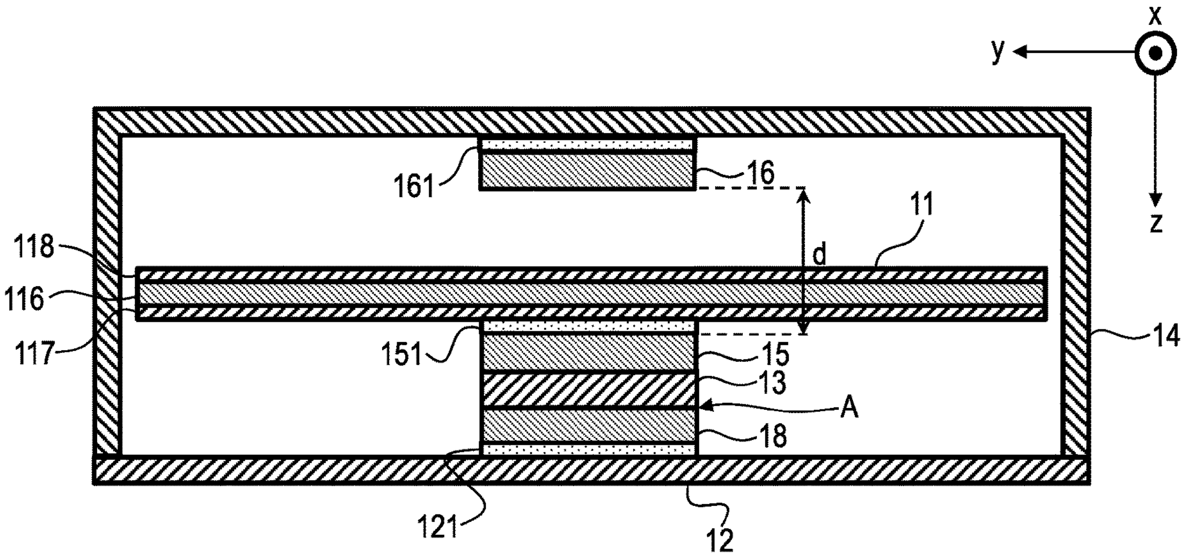
FIG. 12 is a schematic cross-sectional view illustrating a structure of a sound apparatus according to a fifth aspect of the present disclosure.

FIG. 12 is a cross-sectional view schematically illustrating a structure of a sound apparatus 1 according to a fifth aspect of the present disclosure and illustrates a cross-sectional view taken along line 3-3' illustrated in FIG. 2. Except for that a first magnet 15 is disposed at a bottom surface of a piezoelectric device 11 (i.e., a surface adjacent to a vibration member 12), the sound apparatus 1 according to the fifth aspect of the present disclosure may be configured identically to the fourth aspect of the present disclosure. The first magnet 15 may be connected to the bottom surface of the piezoelectric device 11 by an adhesive member 151, and the piezoelectric device 11 may be disposed between the first magnet 15 and a second magnet 16. A third magnet 18 may be connected to the vibration member 12 by the adhesive member 121. An elastic member 13 may be disposed between the first magnet 15 and the third magnet 18. The first magnet 15 and the third magnet 18 may be disposed so that opposite or different magnetic poles are facing (or opposite to) each other. Accordingly, the first magnet 15 may be detachably connected to the third magnet 18 with the elastic member 13 therebetween by using an attractive force (or a sucking force) acting between the first magnet 15 and the third magnet 18. According to the fifth aspect of the present disclosure, the piezoelectric device 11 may be detachably connected to the vibration member 12 at an isolation portion A, and thus, the piezoelectric device 11 may be easily installed and replaced.

In the fifth aspect of the present disclosure, a magnetic force acting between the first magnet 15 and the second magnet 16 and a magnetic force acting between the second magnet 16 and the third magnet 18 may function as a machine resistance and a mass applied to the vibration meter. As described above, the sound apparatus according to the fifth aspect of the present disclosure may realize the same effect as the sound apparatus according to the fourth aspect of the present disclosure.

[Sixth Aspect]

A sound apparatus 1 according to a sixth aspect of the present disclosure will be described with reference to FIG. 13. The sixth aspect of the present disclosure may differ from the fifth aspect in that a first magnet 15 is disposed inward of a piezoelectric device 11. Hereinafter, in the sound apparatus 1 according to the sixth aspect of the present disclosure, elements which differ from the elements of the sound apparatus according to the fifth aspect of the present disclosure will be described mainly.

Figure 13:
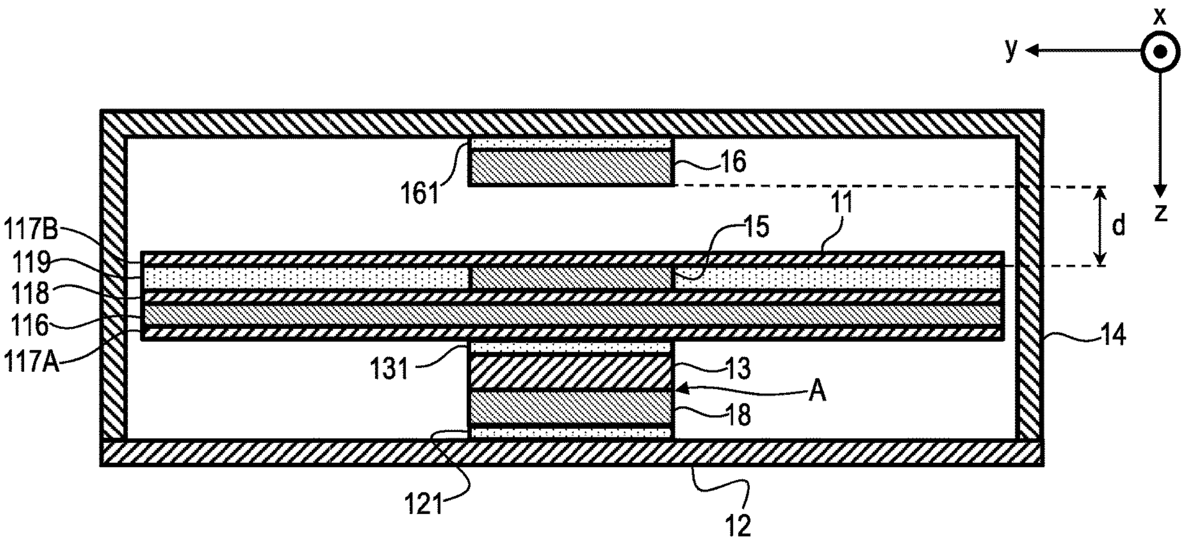
FIG. 13 is a schematic cross-sectional view illustrating a structure of a sound apparatus according to a sixth aspect of the present disclosure.

FIG. 13 is a cross-sectional view schematically illustrating a structure of a sound apparatus 1 according to a sixth aspect of the present disclosure and illustrates a cross-sectional view taken along line 3-3' illustrated in FIG. 2. The piezoelectric device 11 may include a piezoelectric portion 116, a plurality of passivation layers 117A and 117B, an insulation substrate 118, and an adhesive layer 119. The insulation substrate 118 may include an insulating material such as paper phenol or glass epoxy, or the like. The piezoelectric portion 116 may be formed at a bottom surface of the insulation substrate 118 and may be covered by the passivation layer 117A. The passivation layer (or a first passivation layer) 117A may include an insulating inorganic material or an insulating resin material, or the like which is good in water resistance. The first magnet 15 may be disposed at an upper surface of the insulation substrate 118, and an adhesive layer 119 may be disposed around the first magnet 15. The passivation layer (or a second passivation layer) 117B may be formed over the first magnet 15 and the adhesive layer 119. For example, the first magnet 15 and the adhesive layer 119 may be disposed between the insulation substrate 118 and the passivation layer 117B. The passivation layer 117B, like the passivation layer 117A, may include an insulating inorganic material or an insulating resin material, or the like which is good in water resistance.

An elastic member 13 may be connected to a bottom surface of the passivation layer 117A through an adhesive member 131. A third magnet 18 may be disposed at a bottom surface of the elastic member 13. The third magnet 18 may be connected to the vibration member 12 through the adhesive member 121. The first magnet 15 and the third magnet 18 may be disposed so that opposite (or different) magnetic poles are facing (or opposite to) each other, and an attractive force (or a sucking force) may act between the first magnet 15 and the third magnet 18. Accordingly, the piezoelectric device 11 may be detachably connected to the vibration member 12 at an isolation portion A, and thus, the piezoelectric device 11 may be easily installed and replaced.

In the sixth aspect of the present disclosure, a magnetic force acting between the first magnet 15 and the second magnet 16 and a magnetic force acting between the second magnet 15 and the third magnet 18 may function as a machine resistance and a mass applied to a vibration meter. As described above, the sixth aspect of the present disclosure may provide the sound apparatus 1 having the same effect as the fifth aspect of the present disclosure.

[Seventh Aspect]

A sound apparatus 1 according to a seventh aspect of the present disclosure will be described with reference to FIG. 14. The seventh aspect of the present disclosure may differ from the sixth aspect in that a first magnet 15 is disposed at an upper surface (or a top surface) of a piezoelectric device 11. Hereinafter, in the sound apparatus 1 according to the seventh aspect of the present disclosure, elements which differ from the elements of the sound apparatus according to the sixth aspect of the present disclosure will be described mainly.

Figure 14:
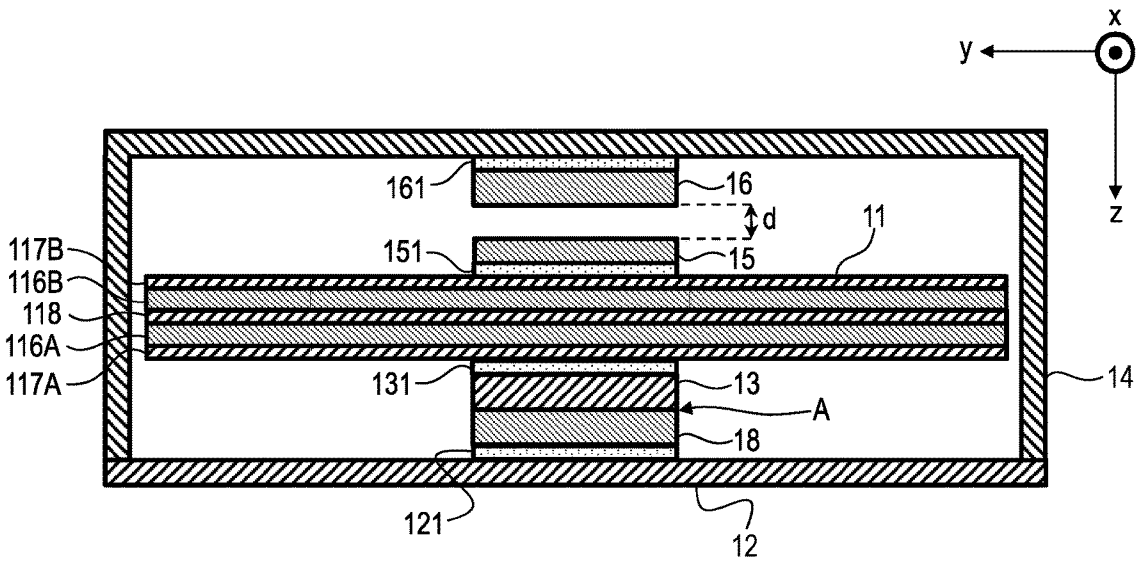
FIG. 14 is a schematic cross-sectional view illustrating a structure of a sound apparatus according to a seventh aspect of the present disclosure.

FIG. 14 is a cross-sectional view schematically illustrating a structure of a sound apparatus 1 according to a seventh aspect of the present disclosure and illustrates a cross-sectional view taken along line 3-3' illustrated in FIG. 2. The piezoelectric device 11 may include a plurality of piezoelectric portions 116A and 116B, a plurality of passivation layers 117A and 117B, and an insulation substrate 118. The piezoelectric portion (or a first piezoelectric portion) 116A may be formed at a bottom surface of the insulation substrate 118. The piezoelectric portion (or a second piezoelectric portion) 116B may be formed at an upper surface (or a top surface) of the insulation substrate 118. The plurality of piezoelectric portions 116A and 116B may be configured to be equal to the piezoelectric portion 116. The piezoelectric portion 116A may be covered or surrounded by the passivation layer (or a first passivation layer) 117A, and the piezoelectric portion 116B may be covered or surrounded by the passivation layer (or a second passivation layer) 117B.

An elastic member 13 may be connected to a bottom surface of the passivation layer 117A through an adhesive member 131. A third magnet 18 may be disposed at a bottom surface of the elastic member 13. The first magnet 15 may be connected to an upper surface (or a top surface) of the passivation layer 117B through the adhesive member 151. A bottom surface of the third magnet 18 may be connected to the vibration member 12 through the adhesive member 121.

In the seventh aspect of the present disclosure, a magnetic force acting between the first magnet 15 and the second magnet 16 and a magnetic force acting between the second magnet 16 and the third magnet 18 may function as a machine resistance and a mass applied to a vibration meter. Also, the piezoelectric device 11 may be detachably connected to the vibration member 12 at an isolation portion A by an attractive force (or a sucking force) acting between the first magnet and the third magnet 18. As described above, the seventh aspect of the present disclosure may provide the sound apparatus 1 having the same effect as the sixth aspect of the present disclosure.

[Eighth Aspect]

A sound apparatus 1 according to an eighth aspect of the present disclosure will be described with reference to FIG. 15. The eighth aspect of the present disclosure may differ from the seventh aspect in that a first magnet 15 is disposed inward of a piezoelectric device 11. Hereinafter, in the sound apparatus 1 according to the eighth aspect of the present disclosure, elements which differ from the elements of the sound apparatus according to the seventh aspect of the present disclosure will be described mainly.

Figure 15:
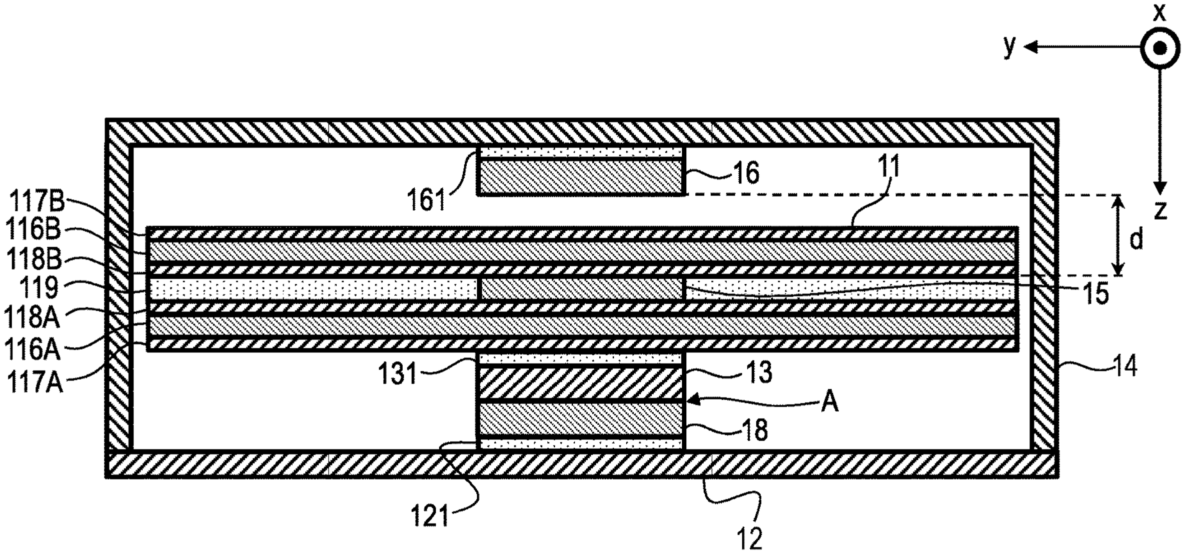
FIG. 15 is a schematic cross-sectional view illustrating a structure of a sound apparatus according to an eighth aspect of the present disclosure.

FIG. 15 is a cross-sectional view schematically illustrating a structure of a sound apparatus 1 according to an eighth aspect of the present disclosure and illustrates a cross-sectional view taken along line 3-3' illustrated in FIG. 2. The piezoelectric device 11 according to an eighth aspect of the present disclosure may include a pair of insulation substrates 118A and 118B which are disposed at predetermined intervals. The first magnet 15 may be disposed between the pair of insulation substrates 118A and 118B. An adhesive layer 119 may be disposed around the first magnet 15. The piezoelectric portion 116A may be formed at a bottom surface of the insulation substrates 118A, and the piezoelectric portion 116A may be covered or surrounded by the passivation layer 117A. The piezoelectric portion 116B may be formed at an upper surface (or a top surface) of the insulation substrates 118B, and the piezoelectric portion 116B may be covered or surrounded by the passivation layer 117B.

An elastic member 13 may be connected to a bottom surface of the passivation layer 117A through an adhesive member 131. A third magnet 18 may be disposed at a bottom surface of the elastic member 13. The third magnet 18 may be connected to the vibration member 12 through the adhesive member 121.

In the eighth aspect of the present disclosure, a magnetic force acting between the first magnet 15 and the second magnet 16 and a magnetic force acting between the second magnet 15 and the third magnet 18 may function as a machine resistance and a mass applied to a vibration meter. Also, the piezoelectric device 11 may be detachably connected to the vibration member 12 at an isolation portion A by an attractive force (or a sucking force) acting between the first magnet and the third magnet 18. As described above, the eighth aspect of the present disclosure may provide the sound apparatus 1 having the same effect as the seventh aspect of the present disclosure.

[Ninth Aspect]

A sound apparatus 1 according to a ninth aspect of the present disclosure will be described with reference to FIGS. 16 and 17. The ninth aspect of the present disclosure may differ from the first aspect in that a magnet is disposed at a plurality of portions of a piezoelectric device 11. Hereinafter, in the sound apparatus 1 according to the ninth aspect of the present disclosure, elements which differ from the elements of the sound apparatus according to the first aspect of the present disclosure will be described mainly.

Figure 16:
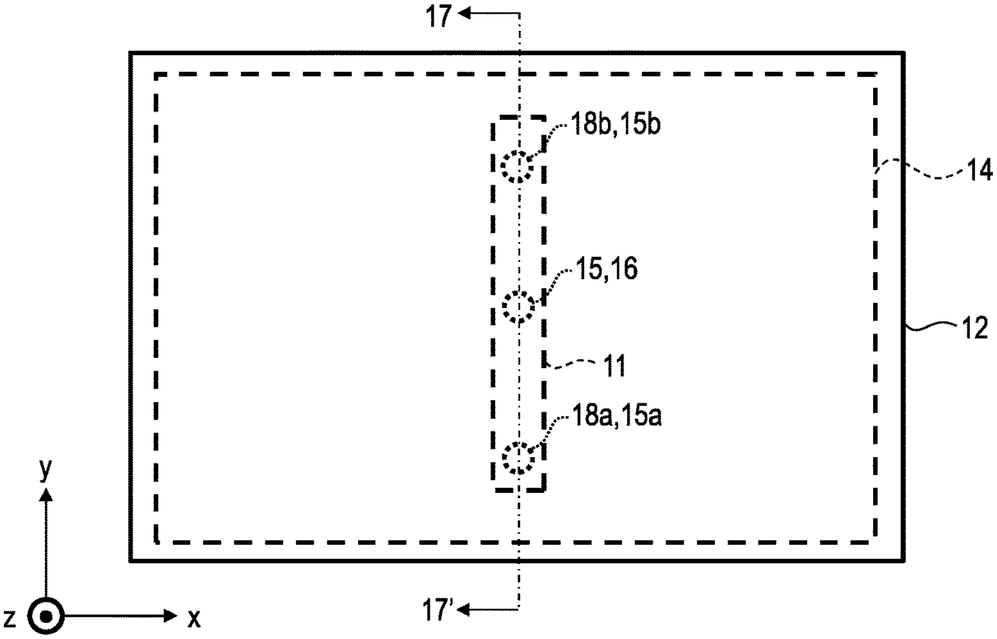
FIG. 16 is a plan view of a detailed configuration of a sound apparatus according to a ninth aspect of the present disclosure.

FIG. 16 is a plan view of a detailed configuration of a sound apparatus 1 according to a ninth aspect of the present disclosure. FIG. 17 is a cross-sectional view of a detailed configuration of the sound apparatus 1 according to the ninth aspect of the present disclosure. FIG. 17 illustrates a cross-sectional view taken along line 17-17' illustrated in FIG. 16. A detailed configuration of the sound apparatus 1 according to the ninth aspect of the present disclosure will be described with reference to FIGS. 16 and 17.

Figure 17:
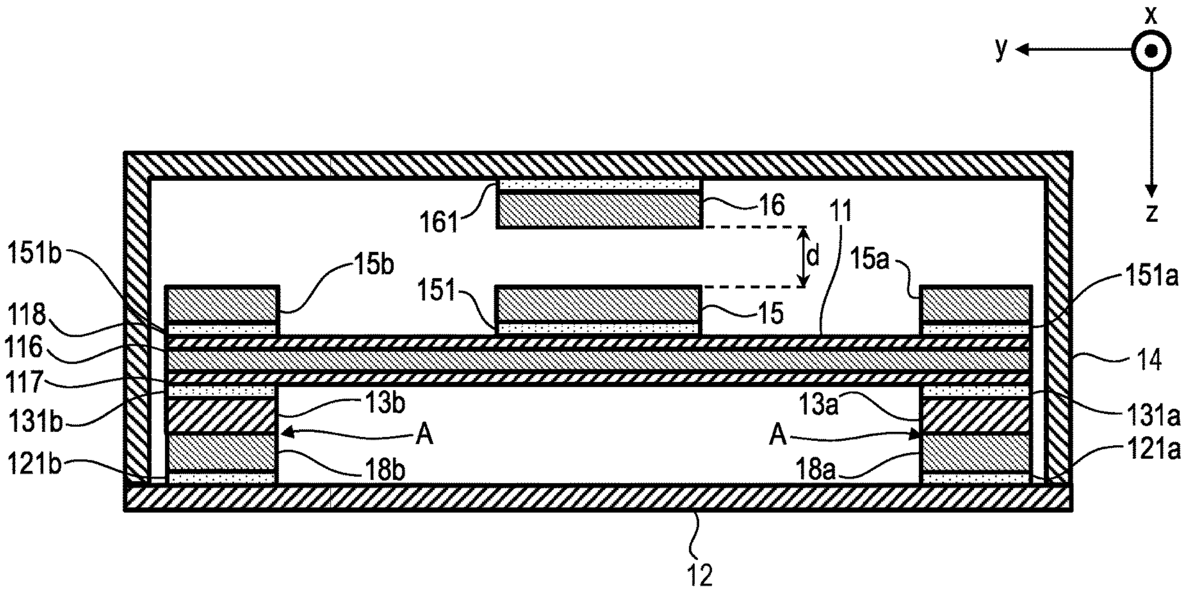
FIG. 17 is a schematic cross-sectional view of a detailed configuration of a sound apparatus according to a ninth aspect of the present disclosure.

As illustrated in FIGS. 16 and 17, a first magnet 15 may be connected to an upper surface (or a top surface) of a center of a piezoelectric device 11 in a y direction through an adhesive member 151. A second magnet 16 may be connected to a case 14 through an adhesive member 161 so as to be opposite to the first magnet 15. A magnet and an elastic member may not be disposed at a bottom surface of the center of the piezoelectric device 11, and the center of the piezoelectric device 11 may not contact a vibration member 12.

A first magnet 15*a* may be connected to an upper surface (or a top surface) of one end portion of the piezoelectric device 11 through an adhesive member 151*a*. Also, a magnet may not be disposed above (or an upward direction) the first magnet 15*a*. Alternatively, a third magnet 18*a* may be disposed at a bottom surface of the one end portion of the piezoelectric device 11 through an elastic member 13*a* and an adhesive member 131*a*. Also, the third magnet 18*a* may be connected to the vibration member 12 through an adhesive member 121*a*. The first magnet 15*a* and the third magnet 18*a* may be disposed so that magnetic poles are opposite. The first magnet may be detachably connected to the third magnet 18*a* with the elastic member 13*a* therebetween by an attractive force (or a sucking force) acting between the first magnet 15*a* and the third magnet 18*a*. Likewise, a first magnet 15*b*, an adhesive member 151*b*, an adhesive member 131*b*, an elastic member 13*b*, a third magnet 18*b*, and an adhesive member 121*b* may be disposed at another end portion of the piezoelectric device 11. The first magnet 15*b* may be detachably connected to the third magnet 18*b* with the elastic member 13*b* therebetween by an attractive force (or a sucking force) acting between the first magnet 15*b* and the third magnet 18*b*. In the ninth aspect of the present disclosure, the piezoelectric device 11 may be detachably connected to the vibration member 12 at an isolation portion A, and thus, the piezoelectric device 11 may be easily installed and replaced.

As described above, the center of the piezoelectric device 11 may be pressed downward (or a downward direction) by the first magnet 15 and the second magnet 16, and both ends of the piezoelectric device 11 may be pressed downward (or the downward direction) by the first magnets 15*a* and 15*b* and the third magnets 18*a* and 18*b*. For example, a total region of the piezoelectric device 11 may be pressed by a magnetic force, and thus, a frequency characteristic and a sound pressure level may be more effectively and easily controlled.

Also, in the ninth aspect of the present disclosure, a vibration of the piezoelectric device 11 may be transferred to the vibration member 12 by a plurality of elastic members 13*a* and 13*b*, and thus, a low frequency vibration of the piezoelectric device 11 may be more easily transferred to the vibration member 12. Accordingly, a sound pressure level based on the low frequency vibration of the piezoelectric device 11 may be more enhanced.

Moreover, the piezoelectric device 11 according to the ninth aspect of the present disclosure may be configured identically to the piezoelectric device 11 according to the fifth aspect of the present disclosure, but like the piezoelectric device 11 according to the seventh aspect of the present disclosure, the piezoelectric device 11 according to the ninth aspect of the present disclosure may further include a plurality of passivation layers and a plurality of piezoelectric portions.

[Tenth Aspect]

A sound apparatus 1 according to a tenth aspect of the present disclosure will be described with reference to FIG. 18. The tenth aspect of the present disclosure may differ from the ninth aspect in that a plurality of first magnets 15, 15*a*, and 15*b* are disposed inward of a piezoelectric device 11. Hereinafter, in the sound apparatus 1 according to the tenth aspect of the present disclosure, elements which differ from the elements of the sound apparatus according to the ninth aspect of the present disclosure will be described mainly.

Figure 18:
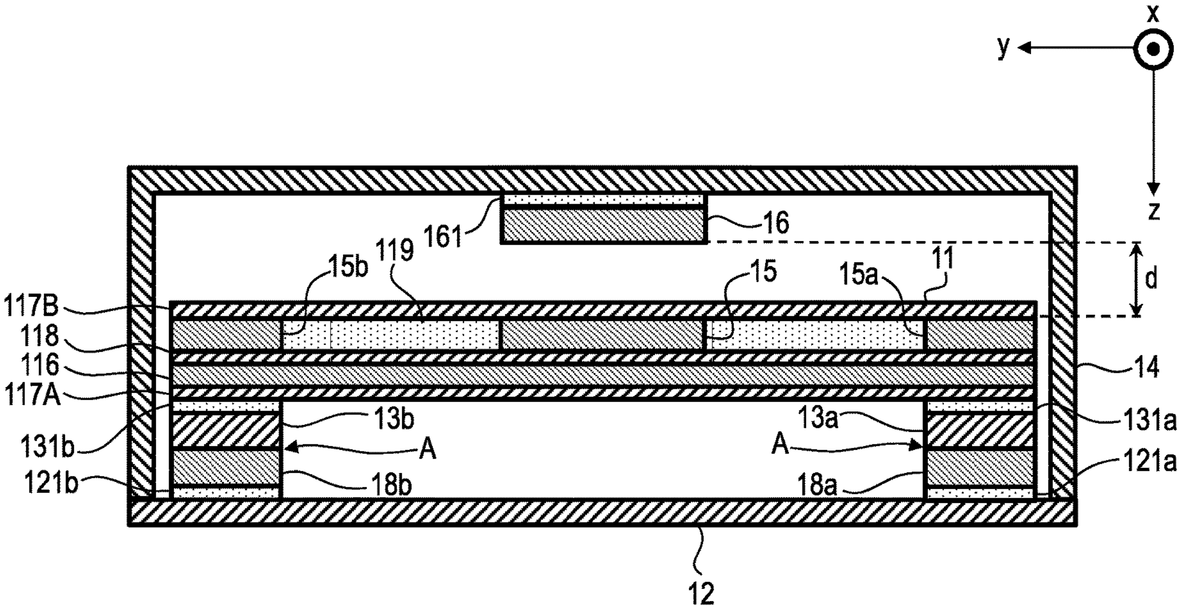
FIG. 18 is a schematic cross-sectional view illustrating a structure of a sound apparatus according to a tenth aspect of the present disclosure.

FIG. 18 is a cross-sectional view schematically illustrating a structure of a sound apparatus 1 according to a tenth aspect of the present disclosure and illustrates a cross-sectional view taken along line 17-17' illustrated in FIG. 16. The piezoelectric device 11 according to a tenth aspect of the present disclosure may include a piezoelectric portion 116, a plurality of passivation layers 117A and 117B, a insulation substrate 118, and an adhesive layer 119. The piezoelectric portion 116 may be formed at a bottom surface of the insulation substrate 118, and the piezoelectric portion 116 may be covered by the passivation layer 117A. The plurality of first magnets 15, 15*a*, and 15*b* may be disposed at an upper surface (or a top surface) of the insulation substrate 118. An adhesive layer 119 may be disposed around the first magnets 15, 15*a*, and 15*b*. The passivation layer 117B may be formed over the adhesive layer 119 and the first magnets 15, and 15*b*. For example, the adhesive layer 119 and the first magnets 15, 15*a*, and 15*b* may be disposed between the insulation substrate 118 and the passivation layer 117B.

An elastic member 13*a* may be connected to a bottom surface of the passivation layer 117A through an adhesive member 131*a*, and an elastic member 13*b* may be connected to a bottom surface of the passivation layer 117A through an adhesive member 131*b*. A third magnet 18*a* may be disposed at a bottom surface of the elastic member 13*a*, and a third magnet 18*b* may be disposed at a bottom surface of the elastic member 13*b*. A bottom surface of the third magnet 18*a* may be connected to the vibration member 12 through the adhesive member 121*a*, and a bottom surface of the third magnet 18*b* may be connected to the vibration member 12 through the adhesive member 121*b*. In the tenth aspect of the present disclosure, the piezoelectric device 11 may be detachably connected to the vibration member 12 at an isolation portion A, and thus, the piezoelectric device 11 may be easily installed and replaced.

In the tenth aspect of the present disclosure, a magnetic force acting between the first magnet 15 and the second magnet 16 and a magnetic force acting between the first magnets 15*a* and 15*b* and the third magnets 18*a* and 18*b* may function as a machine resistance and a mass applied to a vibration meter. Also, the piezoelectric device 11 may be detachably connected to the vibration member 12 at an isolation portion A by using a magnetic force acting between the first magnet 15*a* and the third magnet 18*a*, and a magnetic force acting between the first magnet 15*b* and the third magnet 18*b*. As described above, the tenth aspect of the present disclosure may provide the sound apparatus 1 having the same effect as the ninth aspect of the present disclosure.

[Eleventh Aspect]

In an eleventh aspect of the present disclosure, a detailed aspect where the sound apparatus 1 according to the first to tenth aspects of the present disclosure is a display apparatus and a vibration member 12 performs a function of a display panel of a display apparatus will be described. Descriptions of common elements which are the same as the first to tenth aspects of the present disclosure are omitted or will be briefly given below.

Figure 19:
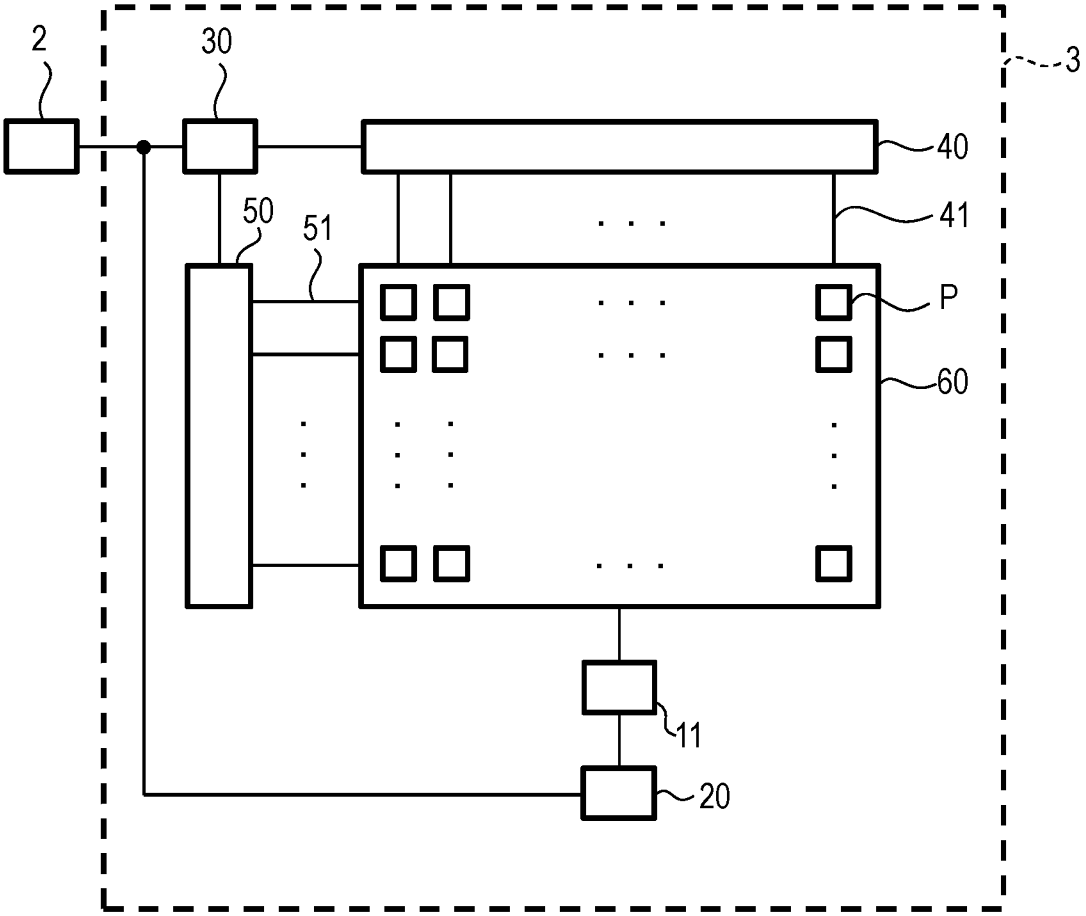
FIG. 19 is a schematic block diagram of a display apparatus according to an eleventh aspect of the present disclosure.

FIG. 19 is a schematic block diagram of a display apparatus 3 according to an eleventh aspect of the present disclosure. The use purpose of the display apparatus 3 according to an eleventh aspect of the present disclosure may be applied to, for example, electronic posters, digital bulletin boards, electronic advertisement signboards, computer displays, televisions, smart phones, or game machines, or the like, but aspects of the present disclosure are not limited thereto. A configuration of each of a host system 2 and a piezoelectric device 11 may be the same as one of the first to tenth aspects of the present disclosure, and thus, their repetitive descriptions may be omitted.

As illustrated in FIG. 19, the display apparatus 3 may include piezoelectric devices 11, a controller 20, a panel controller 30, a data driving circuit 40, a gate driving circuit 50, and a display panel 60. The display apparatus 3 may be an apparatus which displays an image by a display panel based on RGB data or the like input thereto and generates a sound or a vibration based on a sound signal (or a vibration driving signal) or the like input thereto. Thus, the display apparatus may be implemented as a sound apparatus. For example, the piezoelectric devices 11 and the elastic member may be implemented as a vibration apparatus that vibrates the display panel 60 which is a vibration member.

The panel controller 30 may control the data driving circuit 40 and the gate driving circuit based on image data and a timing signal input from the host system 2. The data driving circuit may supply data voltages or the like to a plurality of pixels P through a driving line 41 disposed at each column of the plurality of pixels P. The gate driving circuit 50 may supply a control signal to the plurality of pixels P through a driving line 51 disposed at each row of the plurality of pixels P. Also, each of the driving line 41 and the driving line 51 may be provided in a plurality lines.

The display panel 60 may include the plurality of pixels P arranged to configure a plurality of rows and a plurality of columns. For example, the display apparatus 3 may be an organic light emitting diode (OLED) display using the display panel 60 where an OLED is provided as a light emitting device, but aspects of the present disclosure are not limited thereto. For example, the display apparatus 3 may be a liquid crystal display (LCD) where a liquid crystal panel including a liquid crystal material and a polarizer, or the like is used as the display panel 60. Based on such a structure, the display panel 60 may be thinned, and thus, the structure may be suitable for thinning the display apparatus 3. When the display apparatus 3 is capable of displaying a color image, the pixel P may be a subpixel which displays one of a plurality of colors (for example, RGB) implementing a color image.

The controller 20, the panel controller 30, the data driving circuit 40, and the gate driving circuit 50 may be configured by one semiconductor IC or a plurality of semiconductor ICs. Also, some or all of the controller 20, the panel controller 30, the data driving circuit 40, and the gate driving circuit 50 may be integrally configured as one semiconductor IC (or one body or a single body).

The display apparatus 3 according to an aspect of the present disclosure may be supplied with an image signal (for example, RGB data), a voice signal (or a vibration driving signal), and a timing signal (including a vertical synchronization signal, a horizontal synchronization signal, and a data enable signal, etc.) from a host system 2, and thus, may display an image and simultaneously may generate a sound (or a vibration). The display panel 60 may include an image display surface for displaying an image and a rear surface (or a backside surface) which is opposite to the image display surface. The piezoelectric devices 11 may be connected to the rear surface (or a backside surface) of the display panel 60 through the elastic member 13. Therefore, the display panel 60 may include a function of displaying an image and a function of the vibration member 12 in the first to tenth aspects of the present disclosure. Accordingly, in aspects of the present disclosure, the display apparatus 3 having an acoustic effect where a sound is output from an image displayed by the display panel 60 may be provided. Also, the display panel 60 is not necessarily disposed at the vibrating member 12, but may be disposed, for example, on the outer surface of the lower wall of the case 14 illustrated in FIG. 3.

[Other Aspect]

The above-described aspects of the present disclosure are merely illustrative of several aspects to which the present disclosure may be applied, and the technical scope of the present disclosures should not be construed as being limited according to the above-described aspects. In addition, the present disclosure may be implemented in various aspects through appropriate modifications and/or variations without departing from the technical idea or scope of the disclosures.

A sound apparatus and display apparatus comprising the same according to an aspect of the present disclosure will be described as follows.

A sound apparatus according to an aspect of the present disclosure may comprise a piezoelectric device, a vibration member connected to the piezoelectric device, a first magnet connected to the piezoelectric device, and a second magnet facing the first magnet.

According to some aspects of the present disclosure, the first magnet may be disposed to be spaced apart from the second magnet.

According to some aspects of the present disclosure, the first magnet and the second magnet may be disposed so that same magnetic poles face each other.

According to some aspects of the present disclosure, the first magnet and the second magnet may be disposed so that opposite magnetic poles face each other.

According to some aspects of the present disclosure, the first magnet may be disposed between the piezoelectric device and the second magnet.

According to some aspects of the present disclosure, the piezoelectric device may be disposed between the first magnet and the second magnet.

According to some aspects of the present disclosure, the first magnet may be disposed within the piezoelectric device.

According to some aspects of the present disclosure, the sound apparatus may further comprise a case including an opening covered by the vibration member, the case may include a lower wall, and a side wall formed adjacent to a periphery portion of the lower wall to provide the opening, and the piezoelectric device may be connected to an inner surface of the case by an elastic member at the vibration member.

According to some aspects of the present disclosure, the second magnet may be disposed at the inner surface of the case at the lower wall.

According to some aspects of the present disclosure, the second magnet may be disposed at an outer surface of the case at the lower wall.

According to some aspects of the present disclosure, the sound apparatus may further comprise a third magnet disposed between the first magnet and the vibration member, the first magnet and the third magnet may be disposed so that opposite magnetic poles face each other.

According to some aspects of the present disclosure, the piezoelectric device may be detachably connected to the vibration member by an attractive force between the first magnet and the third magnet.

According to some aspects of the present disclosure, the first magnet may be provided in a plurality, the third magnet may be provided in a plurality, and each of the plurality of third magnet may be disposed to face each of the plurality of first magnet.

According to some aspects of the present disclosure, one of the plurality of the first magnet may face the second magnet and may not face the third magnet, and the other first magnet other than the one first magnet of the plurality of the first magnet may not face the second magnet and may face the third magnet.

According to some aspects of the present disclosure, one of the first magnet may be disposed between the two other first magnets.

According to some aspects of the present disclosure, the vibration member may include any one of a glass, a resin, a hard paper, a compressed paper, plastic, cloth, fiber, leather, metal, and wood.

According to some aspects of the present disclosure, the vibration member may be a signage, or a display panel on which an image is displayed, the display panel may comprise an organic light emitting diode display panel or a liquid crystal display panel.

A display apparatus according to another aspect of the present disclosure may comprise a display panel having an image display surface configured to display an image and a rear surface opposite to the image display surface, and a vibration apparatus configured to vibrate the display panel, the display panel may be a vibration member, the vibration apparatus may comprise the sound apparatus, and the sound apparatus may comprise a piezoelectric device, a vibration member connected to the piezoelectric device, a first magnet connected to the piezoelectric device, and a second magnet facing the first magnet.

According to some aspects of the present disclosure, the display panel may comprise an organic light emitting diode display panel or a liquid crystal display panel.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A sound apparatus, comprising:
- a piezoelectric device;
- a vibration member connected to the piezoelectric device; and
- a first magnet disposed inside the piezoelectric device.

2. The sound apparatus of claim 1, wherein the piezoelectric device comprises:
- a piezoelectric portion; and
- a plurality of cover members covering the piezoelectric portion.

3. The sound apparatus of claim 2, wherein the first magnet is disposed between the piezoelectric portion and at least one of the plurality of cover members.

4. The sound apparatus of claim 2, wherein the first magnet is disposed between two adjacent of the plurality of cover members.

5. The sound apparatus of claim 2, wherein at least one of the plurality of cover members is disposed between the piezoelectric portion and the first magnet.

6. The sound apparatus of claim 2, further comprising an adhesive layer disposed around the first magnet,
- wherein the first magnet is surrounded by the adhesive layer.

7. The sound apparatus of claim 6, wherein the first magnet and the adhesive layer are disposed between two adjacent of the plurality of cover members.

8. The sound apparatus of claim 2, wherein the piezoelectric portion is provided in a plurality, and
- wherein the first magnet is disposed between the plurality of the piezoelectric portion.

9. The sound apparatus of claim 1, further comprising a second magnet disposed outside the piezoelectric device.

10. The sound apparatus of claim 9, wherein the first magnet is spaced apart from the second magnet.

11. The sound apparatus of claim 9, wherein the first magnet and the second magnet are disposed to face a same magnetic pole each other.

12. The sound apparatus of claim 9, wherein the first magnet and the second magnet are disposed to face opposite magnetic poles each other.

13. The sound apparatus of claim 9, wherein the piezoelectric device comprises a piezoelectric portion surrounded by a plurality of cover members,
- wherein the first magnet is disposed between the piezoelectric portion and the second magnet.

14. The sound apparatus of claim 9, further comprising a case covering the vibration member,
- wherein the case includes a cover wall facing the vibration member, and a side wall connecting a periphery portion of the cover wall and the vibration member,
- wherein the piezoelectric device is disposed between the vibration member and the cover wall, is connected to the vibration member by an elastic member.

15. The sound apparatus of claim 14, wherein the second magnet is disposed at the cover wall.

16. The sound apparatus of claim 14, further comprising a third magnet disposed between the first magnet and the vibration member,
- wherein the first magnet and the third magnet are disposed to face opposite magnetic poles each other.

17. The sound apparatus of claim 16, wherein the piezoelectric device is detachably connected to the vibration member by an attractive force between the first magnet and the third magnet.

18. The sound apparatus of claim 16, wherein the first magnet is provided in a plurality,
- wherein the third magnet is provided in a plurality, and
- wherein each of the plurality of third magnet faces each of the plurality of first magnet.

19. The sound apparatus of claim 18, wherein at least one of the plurality of the first magnets faces the second magnet and does not face the third magnet, and
- wherein the other first magnet other than the at least one of first magnet of the plurality of the first magnet does not face the second magnet and faces the third magnet.

20. The sound apparatus of claim 19, wherein at least one of the plurality of the first magnets is disposed between the two other first magnets.

* * * * *